US006106264A

United States Patent [19]

Stenekes

[11] Patent Number: 6,106,264

[45] Date of Patent: Aug. 22, 2000

[54] APPARATUS FOR MOLDING BLOCKS

[75] Inventor: Simon Stenekes, Burlington, Canada

[73] Assignee: NewTec Building Products Inc., Burlington, Canada

[21] Appl. No.: 09/104,189

[22] Filed: Jun. 25, 1998

[51] Int. Cl.[7] .......... B29C 45/18

[52] U.S. Cl. .......... 425/145; 425/150; 425/159; 425/253; 425/260

[58] Field of Search .......... 425/145, 150, 425/159, 253, 260, 432, 448

[56] References Cited

U.S. PATENT DOCUMENTS

| | | | |
|---|---|---|---|
| 2,581,579 | 1/1952 | Davis | 425/159 |
| 3,006,053 | 10/1961 | Miller | 425/253 |
| 3,107,410 | 10/1963 | Davis | 425/159 |
| 3,129,482 | 4/1964 | Wellnitz . | |
| 3,184,818 | 5/1965 | Crile . | |
| 3,233,018 | 2/1966 | Ripley | 425/253 |
| 3,604,075 | 9/1971 | Locke | 425/159 |
| 5,277,853 | 1/1994 | Allison et al. | 425/432 |

FOREIGN PATENT DOCUMENTS

| | | |
|---|---|---|
| 1068723 | 6/1954 | France . |
| 1914159 | 10/1970 | Germany . |

*Primary Examiner*—Tim Heitbrink
*Attorney, Agent, or Firm*—Ingrid E. Schmidt

[57] ABSTRACT

A molding apparatus includes stops which move with a compacting press during penetration of the press into a mold cavity. The stops abut on a mold table and arrest movement of the compacting press so that the compacted shape has a predetermined height. A programmed logic controller integrated with the apparatus measures the time of compaction and is operable to adjust mold filling time so as to control density in the final compacted shape.

9 Claims, 10 Drawing Sheets

APPARATUS FOR MOLDING BLOCKS

FIELD OF THE INVENTION

This invention relates to a molding apparatus used for molding concrete blocks and, in particular, for molding mortarless blocks which, by their nature, must be precisely dimensioned in order to cooperate with adjacent blocks as one cannot compensate for irregularities in the blocks by using mortar.

BACKGROUND OF THE INVENTION

The mass production of blocks is often carried out by filling a mold for a preset period of time with a green concrete mixture and compacting the mixture into a mold for a second pre-set period of time before releasing the mold and removing the molded blocks from the apparatus. Commonly, the compaction of a green concrete mixture is accompanied by vibration in order to ensure that the mixture is uniformly distributed in the mold cavity and to minimize the occurrence of void pockets. The process works well for most masonry applications, such as blocks, bricks, and slabs where mortar is used to compensate for minor irregularities in the dimensions of the finished product of up to ±3 mm.

In the case of mortarless blocks, where projections and corresponding recesses are provided in the blocks to interlock adjacent courses of blocks without any mortar, the dimensional tolerances are much smaller and should not exceed 1 mm in order for the blocks to stack properly without loss of structural integrity and strength.

It is therefore desirable to provide more controls into a block molding process to obtain the necessary dimensional tolerances while maintaining density without loss of productivity.

SUMMARY OF THE INVENTION

In accordance with this invention, there is provided a molding apparatus having a mold for receiving a mixture of moldable material and to shape said mixture into a desired shape;

- a mold table adapted to engage the mold at a predetermined height;
- compacting means for compacting said mixture into the mold, the compacting means being movable relative to the mold, in a direction of travel whereby the compacting means is adapted to penetrate the mold cavity; and
- stop means movable with the compacting means, adapted to engage the mold table and make contact with the mold table during penetration of the compacting means into the mold cavity, the stop means being adapted to limit penetration of the compacting means into the mold cavity whereby the mixture in the mold will have a predetermined height.

In accordance with another aspect of the invention, the stop means includes signalling means for closing an electric circuit which is adapted to arrest continued movement of the compacting means into the mold cavity. Preferably, the signalling means comprises a first portion fixed to a distal end of a slide member slidingly received in a tubular post which extends axially in the direction of travel of the compacting means and which is adapted to limit penetration of the compacting means into the mold cavity. A second portion of the signalling means is supported by the tubular post and the first and second portions are adapted to close the electric circuit when they approach each other during compacting.

In accordance with another aspect of the invention, the electric circuit is also adapted to measure lapsed time $t_c$ during compaction and this is compared to a predetermined ideal compaction time $t_i$ by time adjustment means which periodically adjust the mold filling time $t_f$ for filling the mold with a mixture of moldable material. In this way, the density of moldable material in the final compacted shape is controlled. Where vibrators are provided for vibrating the mold table during filling of the mold, each vibrator may be associated with at least one respective signalling means and vibrated for a respective predetermined mold filling time $t_f$.

BRIEF DESCRIPTION OF THE DRAWINGS

In order that the invention may be better understood, a preferred embodiment is described below with reference to the accompanying drawings, in which.

DESCRIPTION OF PREFERRED EMBODIMENT WITH REFERENCE TO DRAWINGS

Figure 1:
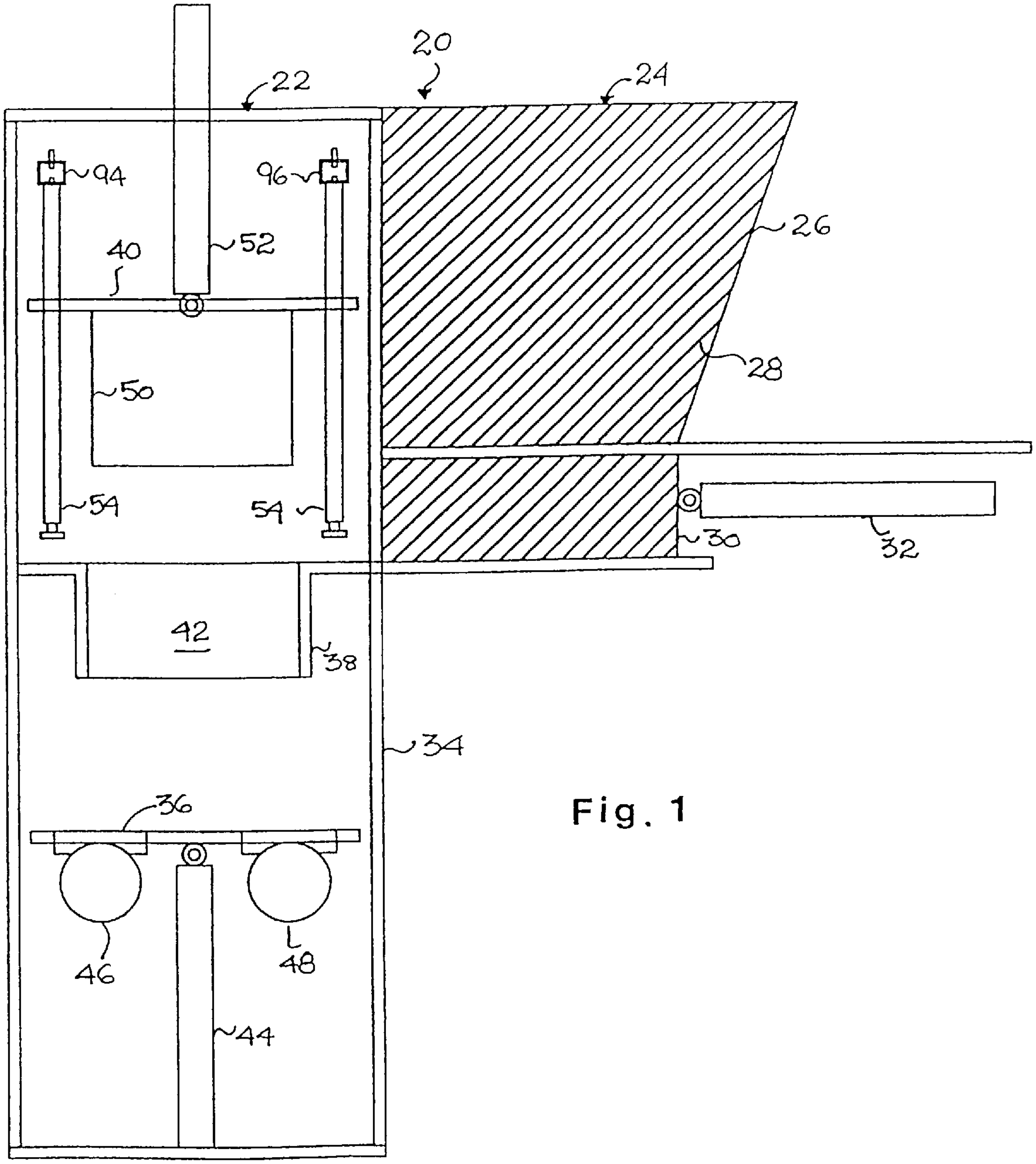
FIG. 1 is a schematic side elevation showing molding apparatus in accordance with the invention, in the first step of a molding cycle.

A molding apparatus in accordance with the invention is generally indicated in the drawings by reference numeral 20. The apparatus 20 comprises a molding column 22 (drawn to the left) and a feeding column 24 (drawn to the right). The feeding column comprises a hopper 26 which, in use, is filled with wet concrete or some other moldable material which is shown in the drawings by a shaded area designated by reference numeral 28. A feed drawer 30 is disposed beneath the hopper 26 and is gravity-fed from the hopper 26 through a bottom gate (not shown). In the drawings, the feed drawer 30 may be moved transversely into and out of the molding column 22 with a hydraulic actuator 32.

A vertically-extending frame 34 supports the feeding column 24 and the molding column 24. The molding column 22 comprises the following components from bottom to top, a vertically-movable mold table 36, a bottomless mold 38, and a vertically-movable compacting head assembly 40.

Figure 2:
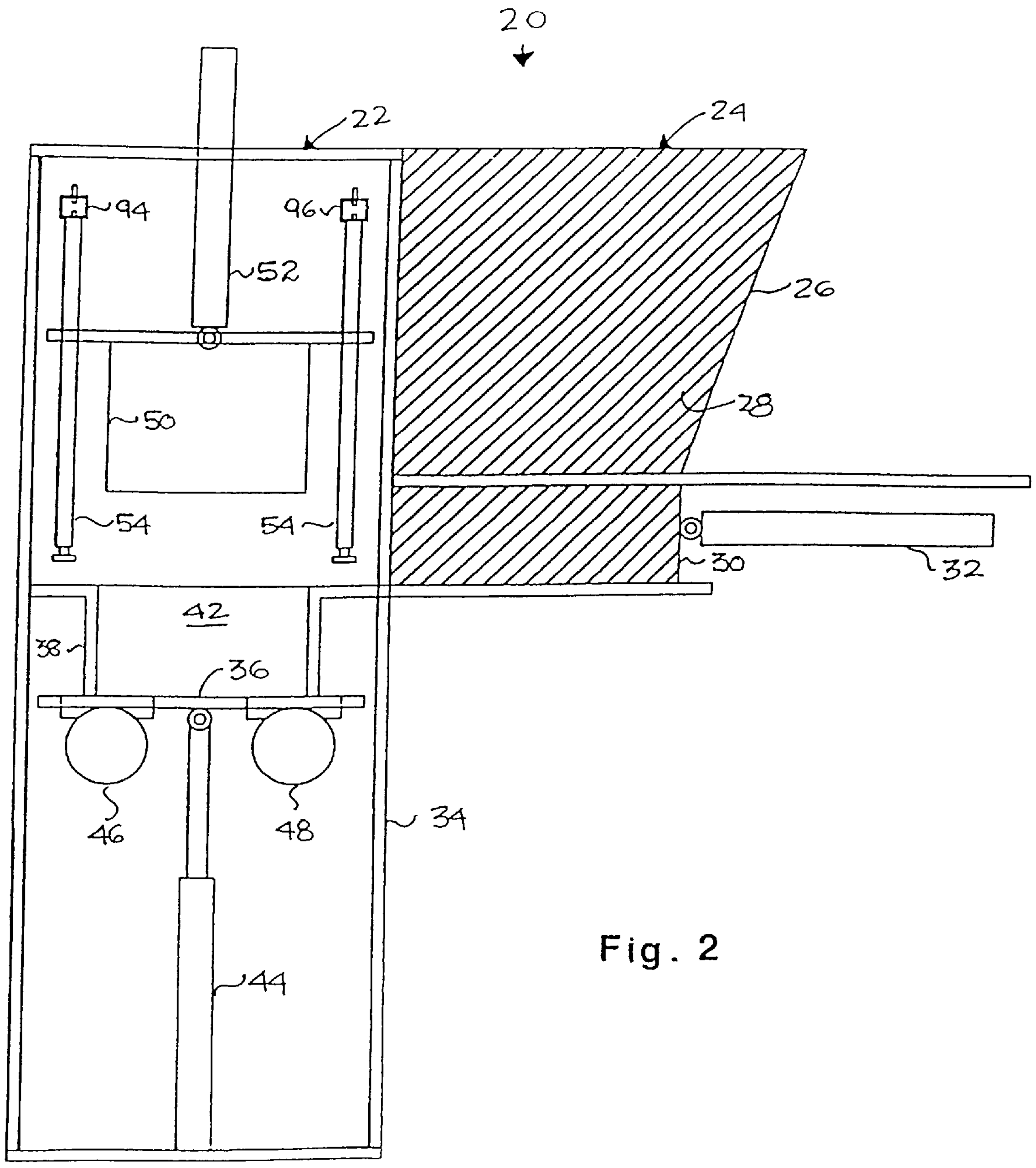
FIG. 2 is a similar view to FIG. 1 showing a mold table raised to close a mold.
Figure 5:
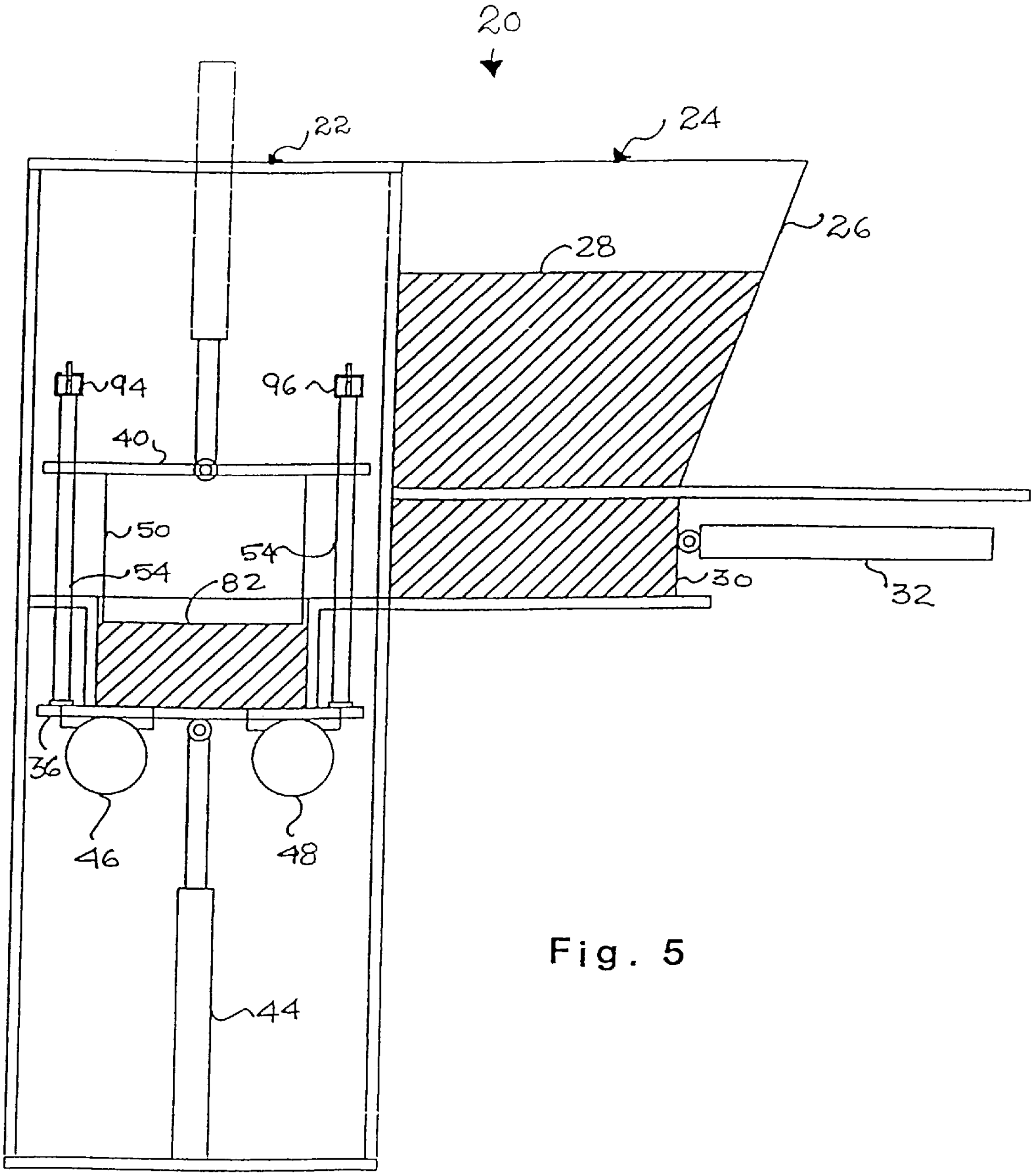
FIG. 5 is a similar view to FIG. 1 showing compacting means penetrating a mold cavity.

In the embodiment illustrated, the mold 38 is fixed to the frame 34 and defines a mold cavity 42 which is adapted to receive the wet concrete mixture 28. The mold table 36 is upwardly movable relative to the mold 38 and will be brought into engagement with the bottom of the mold 38 by means of a hydraulic actuator 44. As seen in FIG. 2, the mold table 36 closes the bottom of the mold 38 and has respective left and right side vibrators 46, 48 disposed beneath the mold table 36 and adapted to vibrate the mold table when the mold 38 is being filled with concrete (FIG. 3) and during compaction of the mold (FIG. 5).

The compacting head assembly 40 includes compacting means in the form of a press 50 which is downwardly-movable towards the mold 38 by means of hydraulic actuator 52 and is adapted to penetrate the mold cavity 42. Stop means generally indicated by numeral 54 are carried by the compacting head assembly 40 and comprise four in number, each associated with a respective corner of the mold table 36.

The operation of the molding apparatus 20 will now be described with reference to FIGS. 2 through 6, each corresponding to a successive step 2–6 in a molding cycle.

Figure 3:
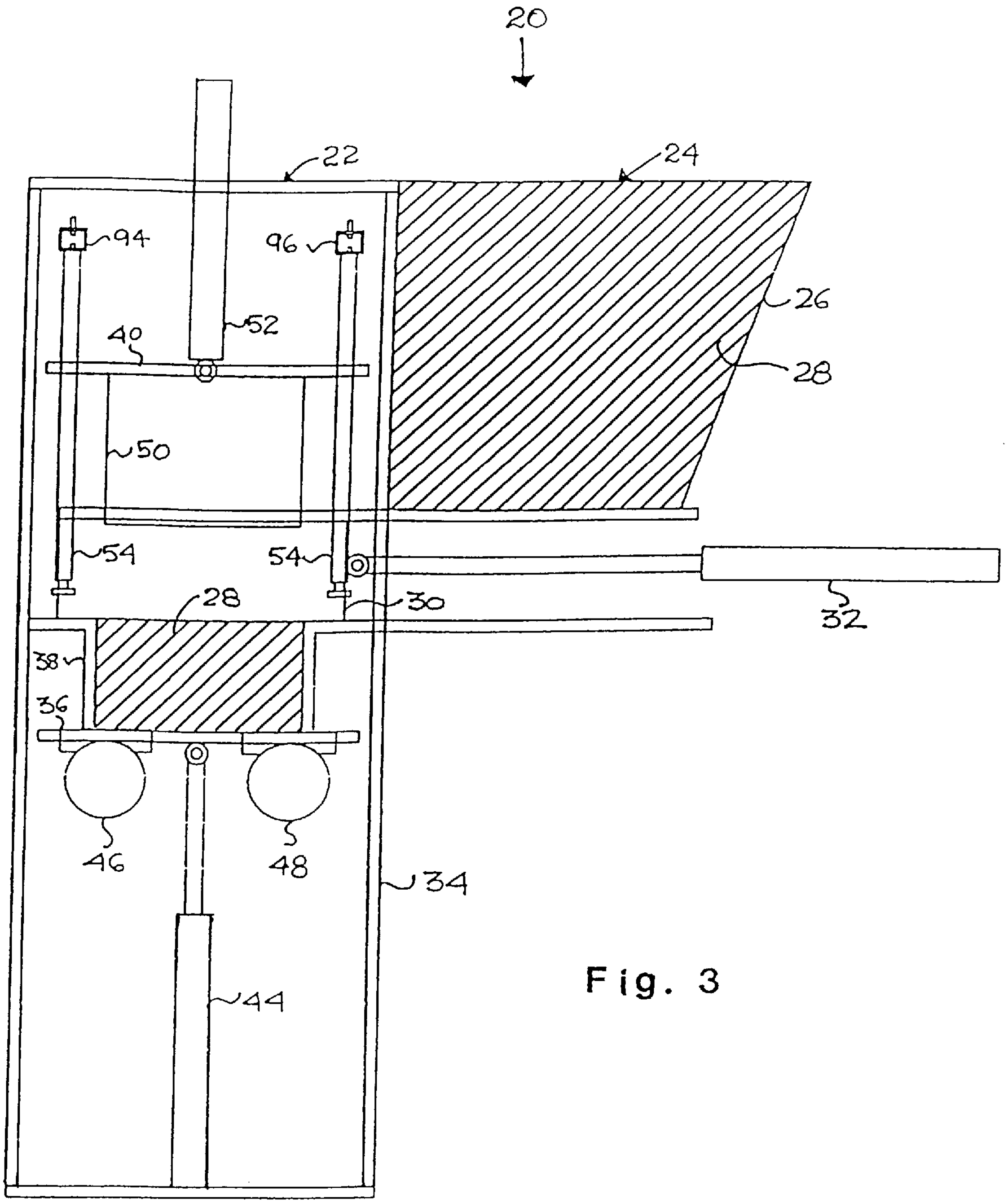
FIG. 3 is a similar view to FIG. 1 showing the mold being filled with a mixture of moldable material and a mold filling means extended into a molding column.
Figure 4:
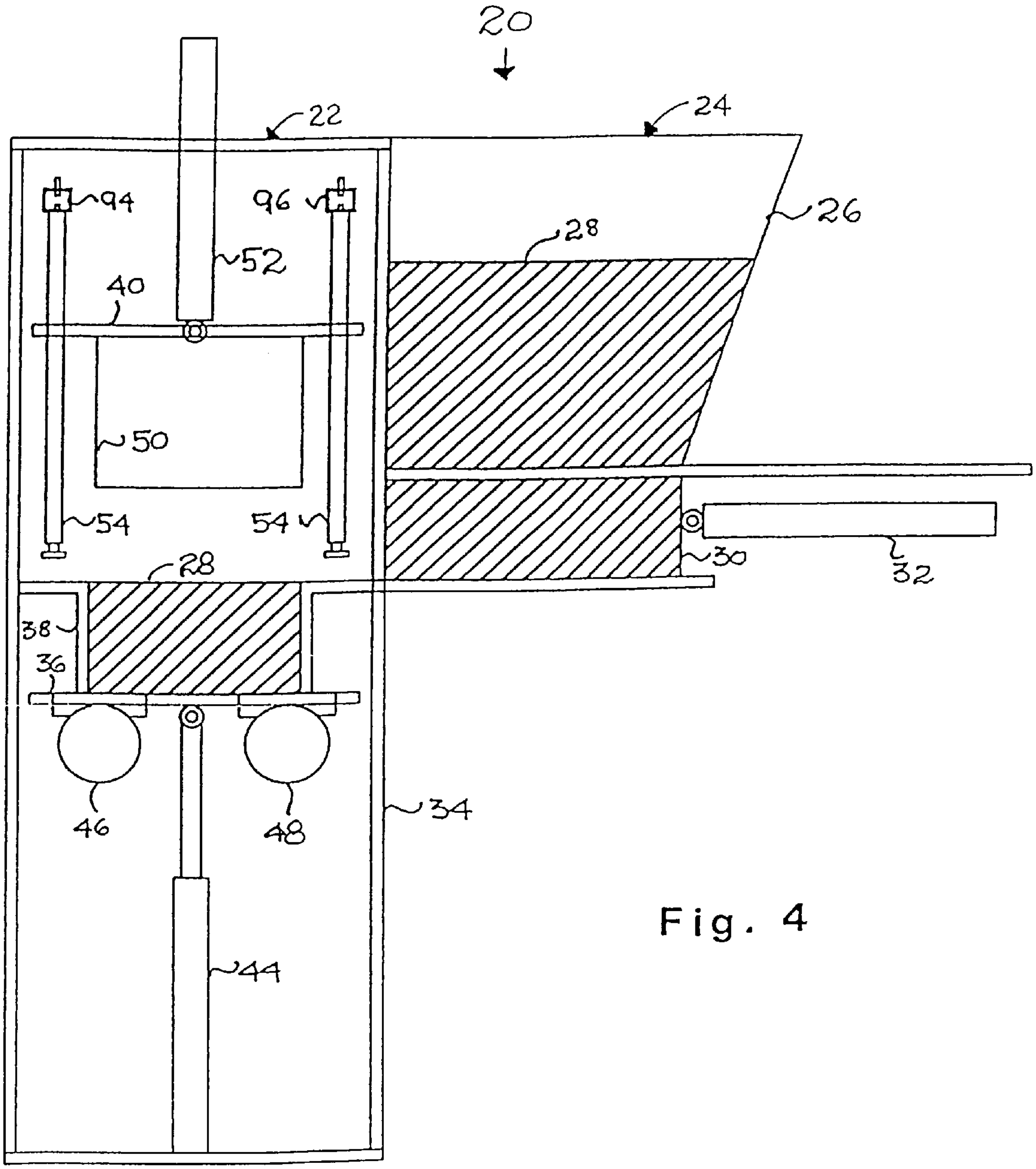
FIG. 4 is a similar view to FIG. 1 showing the mold filling means retracted from the molding column.

In FIG. 2, it will be seen that the mold table 36 is raised to close the bottom of the mold 42 so that it is ready to receive the wet concrete material 28. As shown in FIG. 3, the feed drawer 30 is subsequently moved into the molding column 22 to extend over the mold 38. Wet concrete is delivered into the mold cavity 42 by gravity, with the assistance of the vibrators 46, 48 which are turned on during the mold filling cycle for a predetermined mold filling time $t_f$. When the mold filling cycle is complete, as shown in FIG. 4, the vibrators 46, 48 are stopped and the feed drawer 30 is withdrawn into the feeding column 24 so that it may be filled with concrete for the next molding cycle.

As shown in FIG. 5, the compacting head assembly 40 is lowered so that the press 50 penetrates into the mold cavity 42 and the elapsed time $t_c$ during compaction is measured. The depth of penetration of the press 50 into the mold cavity 42 is limited by the stop means 54 which engage the mold table 36 and make contact with the mold table during penetration of the press into the mold 38.

Figure 6:
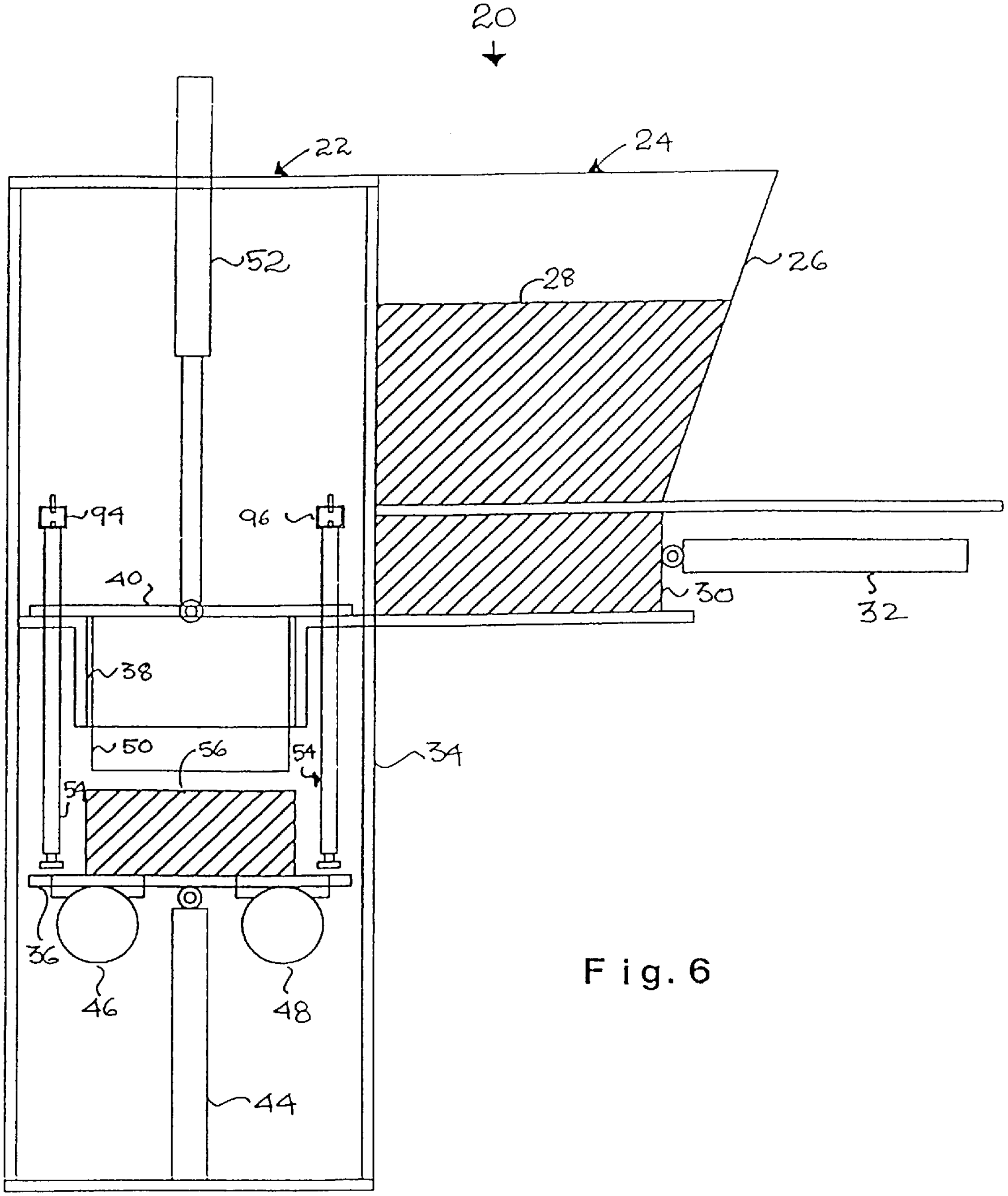
FIG. 6 is a similar view to FIG. 1 showing the mold table retracted from the mold cavity with a finished block supported thereon.
Figure 7:
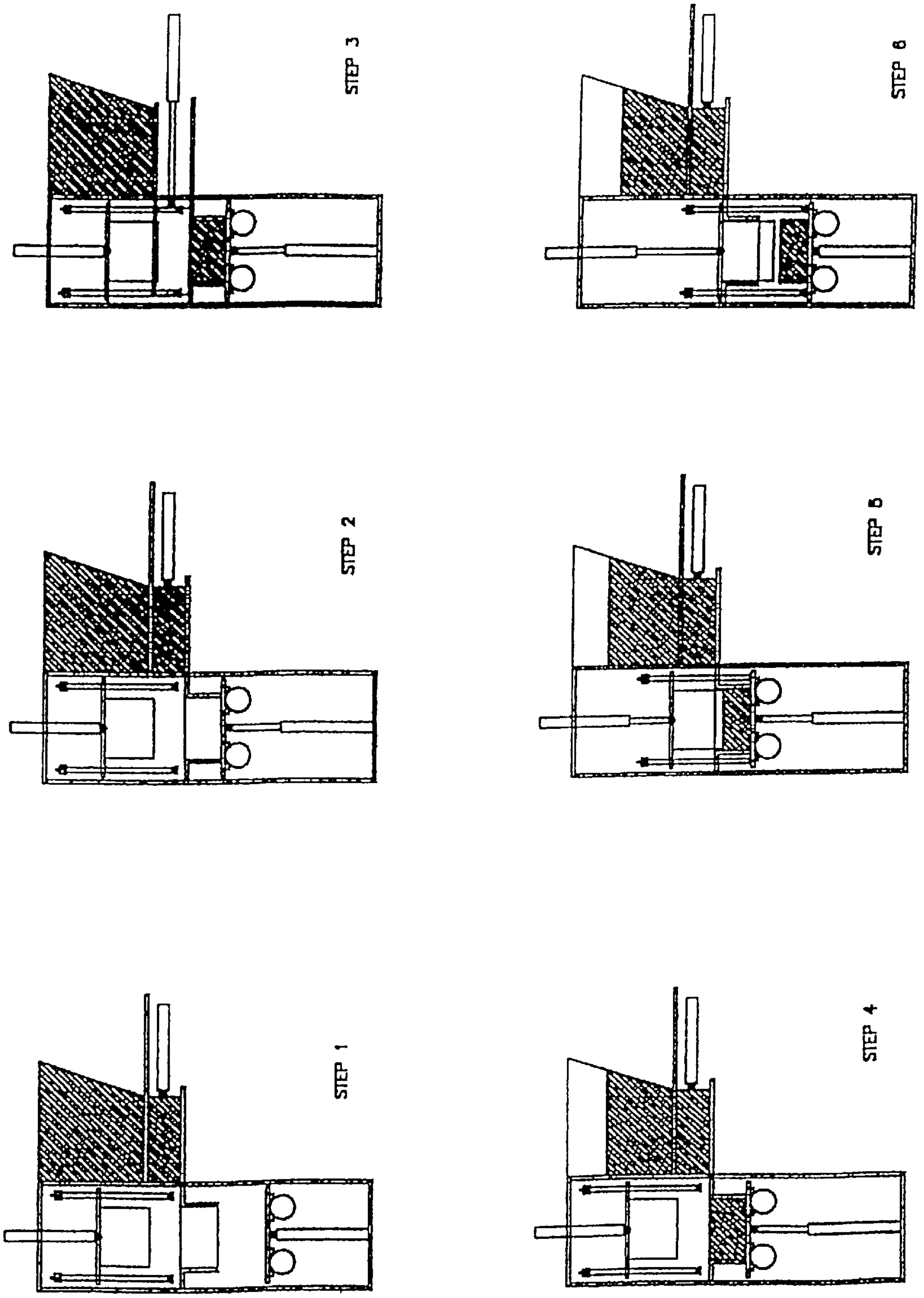
FIG. 7 (drawn to a smaller scale) shows all of the steps of FIGS. 1 through 6 on a single sheet.

In the final step, shown in FIG. 6, the mold table 36 is lowered and the compacting head assembly 40 travels downwardly so that the press 50 follows the mold table 36 and pushes a compacted shape 56 our of the mold 38. The compacted shape 56 is withdrawn from the molding column 22 and the cycle begins again, as shown in FIG. 1, with the compacting head assembly 40 in its operatively-upward position.

Figure 8:
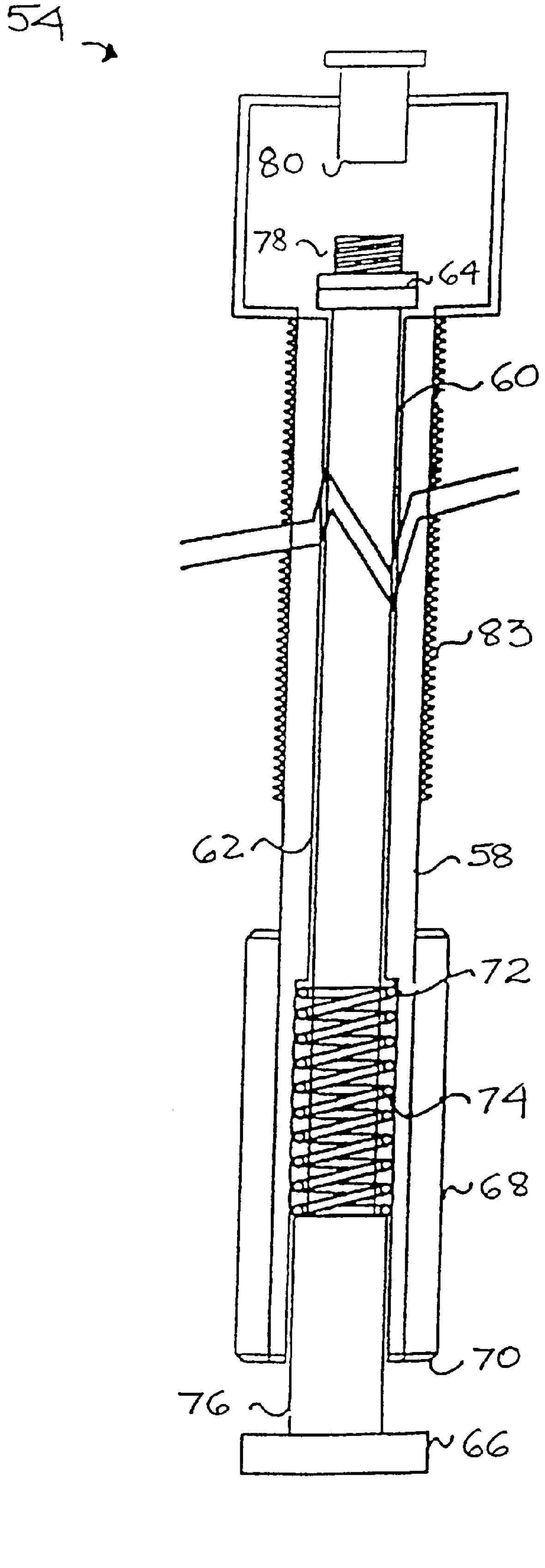
FIG. 8 is a schematic side elevation of stop means forming part of the invention.

The operation of the stop means 54 will now be described in more detail, with particular reference being made to FIG. 8. It will be seen that each stop means 54 comprises a tubular post 58 which extends generally vertically, in the direction of travel of the compacting head assembly 40. Since the posts 58 are carried by the compacting head assembly 40, they move with the press 50 upon actuation of the actuator 52 to move the press into the mold cavity 42. A slide member in the form of a rod 60 is slidingly received inside each tubular post 58 and supported therein so as to extend axially in the direction of travel of the compacting means.

Since all of the stop means 54 are identical, only one is described below.

Downward movement of the rod 60 through an axial bore 62 of the tubular post 58 is limited by means of a lock-nut 64 threaded onto a distal end of the rod 60 and having an outer diameter which exceeds the diameter of the bore 62. At a lower end of the rod 60, proximate to the mold, in use, the rod is formed with a transversely-extending disc 66 of which the outer (lower) surface is adapted to engage the mold table 36 and the inner (upper) surface is adapted to engage the tubular post 58. It will be seen that the proximal end of the tubular post 58 is reinforced over a portion of its length by an annular brace 68 so as to withstand impacts when the compacting head assembly 40 is lowered and a proximal end 70 of the post 58 makes contact with the upper surface of the disc 66.

The axial bore 62 of the post 58 has a shoulder 72 cut into the proximal end to define a wider diameter opening which receives coiled spring biasing means 74 trapped between the shoulder 72 and a wide diameter portion 76 of the rod 60. The spring biasing means 74 thus will operate to dampen any shocks transmitted to the rod 60 upon making impact with the mold table 36.

The distal end of the rod 60 carries a first portion 78 forming part of signalling means which close an electric circuit for arresting continued movement of the compacting press 50 into the mold cavity 42. A second portion 80 of the signalling means is supported by the tubular post 58 and is upwardly-spaced from the first portion 78 by a maximum predetermined distance.

The disc 66 at the proximal end of the rod 60 makes initial contact with the mold table 36 and continued movement of the rod is arrested. The surrounding tubular post 58 continues its downward movement with the press 50, thereby compressing coiled spring biasing means 74 until the proximal end 70 of the post comes into engagement with the disc 66 whereupon the compacting head 40 is physically arrested and halts its downward movement.

As can best be appreciated from FIG. 5, the penetration of the press 50 into the mold cavity 42 and consequently the height of the compacted shape 56 is limited by the axial separation between the proximal end 82 of the press 50 and the proximal end 70 of the post 58. The height of the compacted shape 56 is equal to the sum of this axial separation and the thickness of the disc 66 and may be adjusted to suit the particular shape being molded. In the embodiment illustrated, the tubular post 58 has a threaded portion 83 over a portion of its length and is formed into two sections which are joined by a threaded sleeve (not shown) for adjusting the effective length of the post, and accordingly the penetration of the press 50 into the mold cavity 42. The effective length of the post 58 may also be adjusted to be appropriate for different molds used to produce other compacted shapes.

After the rod 60 makes initial contact with the mold table 36, and the tubular post 58 continues its descent with the compacting head assembly 40, the second portion 80 of the signalling means approaches the first portion 78 on the distal end of the rod 60. The first and second portions 78, 80 are separated by a maximum predetermined distance which gradually diminishes during compaction. Depending on the nature of the signalling means selected, an electric circuit will be closed as the two portions approach each other or when physical contact is made. The initial distance separating the first and second portions 78, 80 will be commensurate with the initial axial separation between the proximal end 70 of the post 58 and the upper surface of the disc 66.

Figure 10:
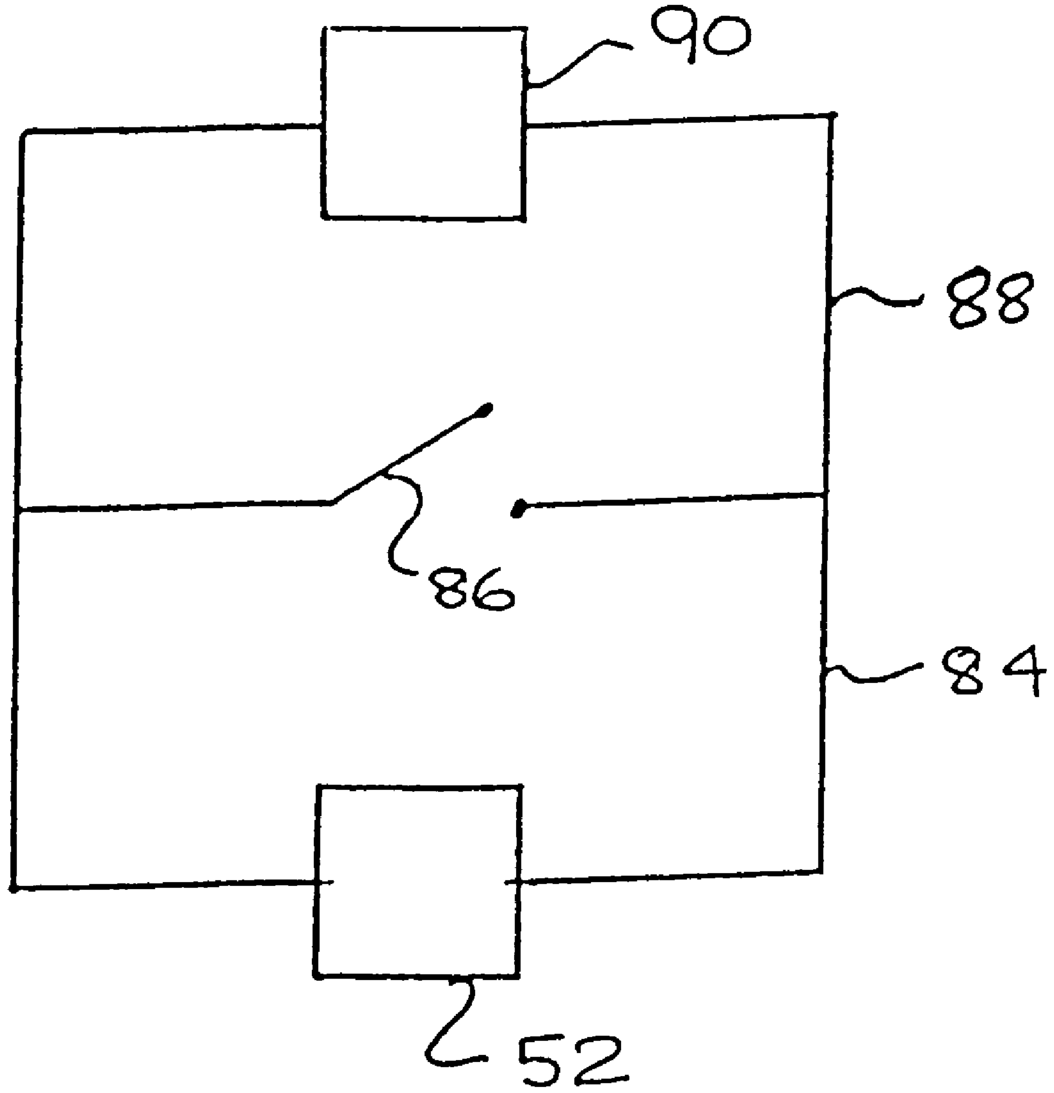
FIG. 10 is a schematic electric circuit forming part of the invention.

Closing of an electric circuit 84 is symbolically illustrated by switch 86 in FIG. 10 of the drawings. It will be seen that the hydraulic actuator 52 forms part of the circuit 84 so as to be activated or deactivated, as the case may be, by switch 86. Closing switch 86 also causes a second electric circuit indicated by numeral 88 to supply a programmed logic controller (PLC) indicated by numeral 90.

The PLC 90 measures elapsed time during compaction, i.e., the time elapsed while the compacting head assembly is in movement, and compares the compaction time $t_c$ to a predetermined ideal compaction time $t_i$. When the compaction time $t_c$ is less than $t_i$, it is an indication that the density of moldable material 28 in the mold 38 is too low and that more material should be added to the mold 38 in subsequent molding cycles of the molding apparatus. Conversely, if the elapsed time $t_c$ during compaction is greater than the ideal compaction time $t_i$, it is an indication that the mold 38 has been overfilled. The PLC 90 is adapted to vary a predetermined mold filling time $t_f$ during step 3 of the molding cycle accordingly (FIG. 3). This is accomplished by turning the vibrators 46, 48 on for more or less time, in accordance with the requirements of the situation.

Figure 9:
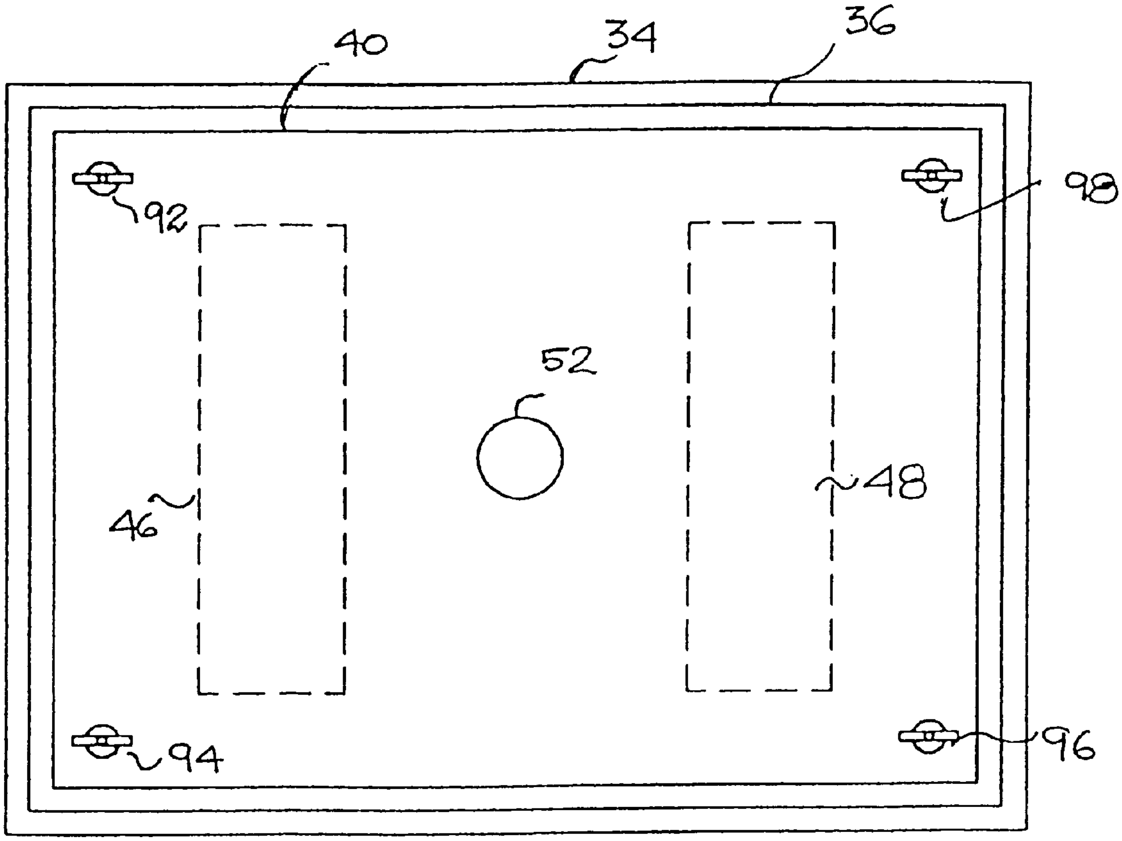
FIG. 9 is a top plan view (drawn to a larger scale) of the molding column drawn in FIGS. 1 through 7.

In the embodiment under consideration, there are four signalling means or switches 86, each associated with a post 58. The four signalling means are respectively designated in FIG. 9 by numerals 92, 94, 96 and 98. The elapsed time $t_c$ during compaction for each of the posts is measured by the PLC 90, it being understood that the hydraulic actuator 52 is not arrested until there has been a predetermined delay following closure of the switch 86 so that there can be a reading of elapsed time $t_c$ originating from each of the stop means 54.

Signalling means 92, 94 are respectively associated with left vibrator 46 and signalling means 96, 98 are respectively associated with right vibrator 48. The average of the compaction time $t_c$ measured by signalling means 92, 94 is compared to an ideal mold compaction time $t_i$ predetermined by experience and falling into an ideal range programmed into the PLC 90, for example, 275 to 325 milliseconds. If the average $t_c$ value falls within the ideal range, no correction to the mold filling time $t_f$ is required. However, if the average of the readings from signalling means 92, 94 falls within a first range outside of the ideal range, for example, 225 to 275 milliseconds, and such a discrepancy falling within this low range is sustained in the following cycle, the mold filling time $t_f$ is subsequently increased. However, if the average of the readings from the signalling means 92, 94 falls within a second range which is significantly lower than the ideal range, for example, 150 to 225 milliseconds, immediate corrective action may be taken in the following cycle to increase the mold filling time $t_f$ by prolonging the time during which the associated vibrator 46 will be kept on.

Similarly, the average of the compaction time readings $t_c$ from the signalling means 96, 98 will be calculated and compared to the ideal compaction time $t_i$ and corresponding adjustments will be made to increase or decrease the vibration time for vibrator 48. A high reading indicating that the fill time should be reduced might fall in the range of 325 to 375 milliseconds. Depending on the nature of the molded shape and of the moldable material, immediate corrective action may be taken on the very next following cycle or this may be delayed so as to take corrective action only if there is a consistent high reading over two or more successive cycles. Immediate corrective action could, on the other hand, be taken if the average of the readings from signalling means 96, 98 fell in a high range of 375 to 500 milliseconds.

In use, the PLC 90 is integrated into the molding apparatus 20 to automatically control its operation and may include a visual display and audible alarms for alerting an operator when corrective action is required.

It will be understood that the stop means 54, in accordance with the invention, provide a physical control to determine the height of a molded shape. By coupling the stop means 54 with signalling means, and measuring compaction time $t_c$, the invention provides means to control the mass of moldable material delivered to the mold by adjusting the mold filling time $t_f$ and thus controls the density in the final compacted shape.

Several variations may be made to the above-described embodiment of the invention. In particular, it will be understood that the mold table may be associated with any number of vibrators and that the vibration time could be determined by respective signalling means comprising one or more sets of sensors. Further, it will be understood that the nature of the moldable material will determine the magnitude of the ideal compaction time and that the PLC 90 may be programmed accordingly. The described preferred embodiment is intended to be by way of illustration and is not intended to limit the scope of the appended claims. Other variations will be apparent to those skilled in the art.

What is claimed is:

1. Molding apparatus having a mold defining a mold cavity for receiving a mixture of moldable material and for shaping said mixture into a desired shape;

a mold table for engaging the mold at a predetermined height; and compacting means for compacting said mixture into the mold, the compacting means being movable relative to the mold in a direction of travel wherein the compacting means penetrates the mold cavity;

stop means carried by said compacting means and including at least one tubular post extending axially in the direction of travel of the compacting means for limiting penetration of the compacting means into the mold cavity, a proximal end of the compacting means and a proximal end of the post, relative to the mold, defining an axial separation which is commensurate with a predetermined height of the mixture in the mold;

a slide member comprising a rod slidingly received in said post and supported therein so as to extend axially in the direction of travel of the compacting means, the slide member having a proximal end for making initial contact with the mold table during penetration of the compacting means into the mold cavity; and signalling means comprising a first portion fixed to a distal end of the slide member remote from the mold table and a second portion supported by said stop means and axially spaced from said first portion by a maximum predetermined distance, said first and second portions closing an electric circuit upon continued movement of the compacting means in the direction of travel after the proximal end of said slide member makes initial contact with the mold table, said electric circuit having means for arresting continued movement of the compacting means into the mold cavity.

2. Apparatus according to claim 1 in which said electric circuit has means for measuring elapsed time $t_c$ elapsed during compaction, the apparatus further including mold filling means for filling the mold with a mixture of moldable material for a predetermined mold filling time $t_f$, said mold filling means being movable into and out of registration with said mold; and a programmable logic controller coupled to said signalling means having time adjustment means for periodically adjusting said predetermined mold filling time $t_f$ to increase $t_f$ when the elapsed time $t_c$ during compaction is less than $t_i$ and to decrease $t_f$ when the elapsed time $t_c$ during compaction is greater than $t_i$, $t_i$ being a predetermined ideal compaction time, thereby controlling the density of moldable material in a compacted shape formed in the mold.

3. Apparatus according to claim 2 having at least two vibrators for vibrating the mold table during filling of the mold, each vibrator being associated with at least one respective signalling means and coupled to said programmable logic controller to vibrate for a respective predetermined mold filling time $t_f$;

said programmable logic controller being programmed for selectively adjusting said pre-determined mold filling time $t_f$ for each vibrator so that the mold filling time may vary in areas of the mold table associated with different vibrators.

4. Molding apparatus having a mold defining a mold cavity for receiving a mixture of moldable material and for shaping said mixture into a desired shape;

a mold table for engaging the mold at a predetermined height;

compacting means for compacting said mixture into the mold, the compacting means being movable relative to the mold, in a direction of travel wherein the compacting means penetrates the mold cavity;

stop means movable with the compacting means for engaging the mold table and making contact with the mold table during penetration of the compacting means into the mold cavity, the stop means limiting penetration of the compacting means into the mold cavity so that the mixture in the mold will have a predetermined height;

support means carried by said compacting means;

a slide member slidingly supported by said support means and extending axially in the direction of travel of the compacting means, the slide member having a proximal end for contacting the mold table during penetration of the compacting means into the mold cavity and axially movable relative to said support means; and signalling means comprising a first portion fixed to a distal end of the slide member remote from the mold table and a second portion supported by said support means and axially spaced from said first portion by a maximum predetermined distance, said first and second portions closing an electric circuit upon continued movement of the compacting means in the direction of travel after said proximal end makes initial contact with the mold table, said electric circuit having means after arresting continued movement of the compacting means into the mold cavity.

5. Apparatus according to claim 4 in which said support means includes a post extending axially in the direction of travel of the compacting means, a proximal end of the slide member and a proximal end of the post, relative to the mold, defining an axial separation which is commensurate with said maximum predetermined distance spacing the second portion from the first portion of said signalling means.

6. Apparatus according to claim 5 in which the post is tubular and said slide member comprises a rod slidingly received in said post, the rod having a transversely-extending disc for engaging the mold table on an outer surface thereof and for engaging the tubular post on an inner surface thereof.

7. Molding apparatus having a mold having an open bottom and defining a mold cavity for receiving a mixture of moldable material and for shaping said mixture into a desired shape;

compacting means for compacting said mixture into the mold, the compacting means being movable relative to the mold, in a direction of travel wherein the compacting means penetrates the mold cavity;

a mold table for engaging the mold to close the bottom of the mold and movable relative to the mold in said direction of travel;

stop means movable with the compacting means for engaging the mold table and making contact with the mold table during penetration of the compacting means into the mold cavity, the stop means limiting penetration of the compacting means into the mold cavity so that the mixture in the mold will have a predetermined height; and signalling means associated with said stop means for closing an electric circuit upon continued movement of the compacting means in the direction of travel after the stop means engages the mold table, said electric circuit having means for measuring elapsed time $t_c$ elapsed during compaction, the apparatus further including mold filling means for filling the mold with a mixture of moldable material for a predetermined mold filling time $t_f$, said mold filling means being movable into and out of registration with said mold; and a programmable logic controller coupled to said signalling means having time adjustment means for periodically adjusting said predetermined mold filling time $t_f$ to increase $t_f$ when the elapsed time $t_c$ during compaction is less than $t_i$ and to decrease $t_f$ when the elapsed time $t_c$ during compaction is greater than $t_i$, $t_i$ being a predetermined ideal compaction time, thereby controlling the density of moldable material in a compacted shape formed in the mold.

8. Apparatus according to claim 7 having at least two vibrators for vibrating the mold table during filling of the mold, each vibrator being associated with at least one respective signalling means and coupled to said programmable logic controller to vibrate for a respective programmable logic controller to vibrate for a respective predetermined mold filling time $t_i$; and said programmable logic controller being programmed for selectively adjusting said predetermined mold filling time $t_f$ for each vibrator so that the mold filling time may vary in areas of the mold table associated with different vibrators.

9. Molding apparatus having a mold defining a mold cavity for receiving a mixture of moldable material for shaping said mixture into a desired shape;

a mold table for engaging tile mold at a predetermined height;

mold filling means for filling the mold with a mixture of moldable material for a predetermined mold filling time $t_f$, said mold filling means being movable into and out of registration with said mold; and compacting means for compacting said mixture into the mold, the compacting means being movable relative to the mold in a direction of travel wherein the compacting means penetrates the mold cavity;

stop means movable with the compacting means limiting penetration of the compacting means into the mold cavity so that the mixture in the mold will have a predetermined height;

signalling means for measuring time $t_c$ elapsed during compaction;

a programmable logic controller coupled to said signalling means and having time adjustment means for periodically adjusting said predetermined mold filling time $t_f$ to increase $t_f$ when the elapsed time $t_c$ during compaction is less than $t_i$, $t_i$ being a predetermined ideal compaction time, thereby controlling the density of moldable material in a compacted shape formed in the mold; and at least two vibrators for vibrating the mold table during filling of the mold, each vibrator being associated with at least one respective signalling means and coupled to said programmable logic controller to vibrate for a respective predetermined mold filling time $t_f$;

said programmable logic controller being programmed for selectively adjusting said predetermined mold filling time $t_f$ for each vibrator so that the mold filling time may vary in areas of the mold table associated with different vibrators.

* * * * *